Nov. 28, 1939.  J. W. ADAMS  2,181,540
IRRIGATING IMPLEMENT
Filed Aug. 9, 1937
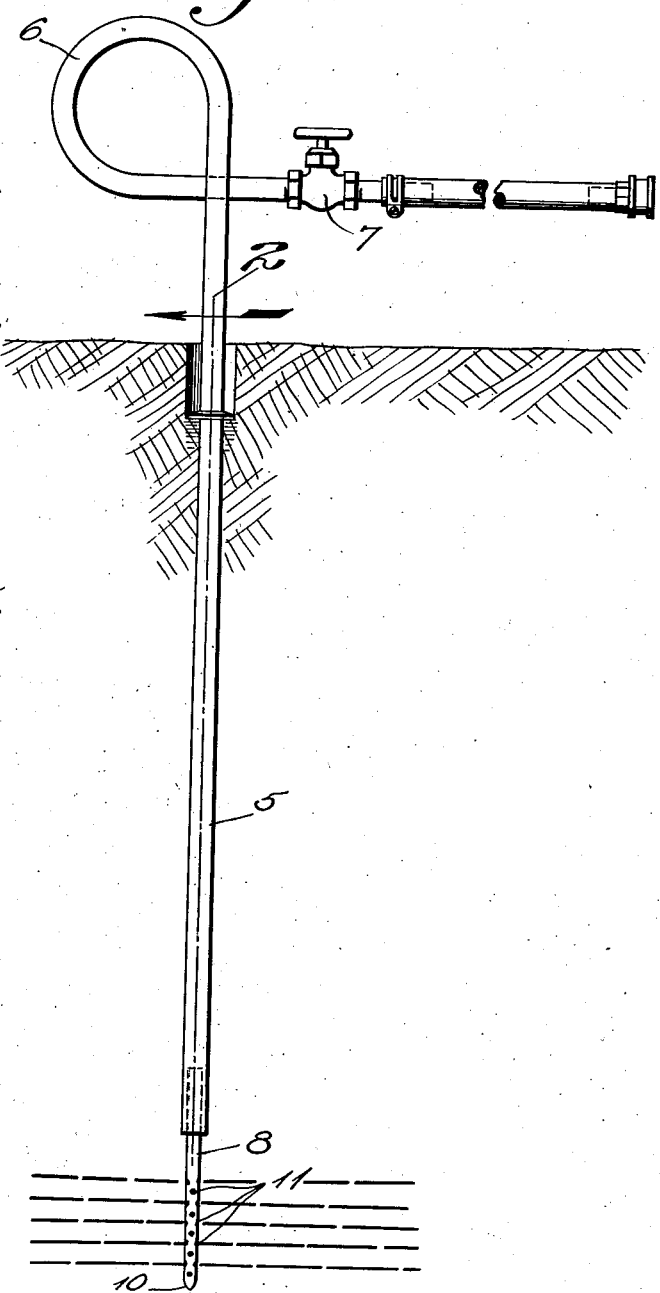
John W. Adams
INVENTOR Patented Nov. 28, 1939

2,181,540

UNITED STATES PATENT OFFICE 2,181,540

IRRIGATING IMPLEMENT

John W. Adams, Duncan, Okla.

Application August 9, 1937, Serial No. 158,226

2 Claims. (Cl. 47—49)

My invention relates to irrigating implements and more particularly to a type adapted for insertion in the ground adjacent a plant.

I am aware that various forms of irrigating implements have been developed for insertion in the ground to irrigate the roots of plants and the like, however, many implements of this character while permitting the water or fertilizing fluid to be discharged within the ground also permits the same to seep or flow out of the ground about the implement instead of pervading the soil and feeding adjacent plants.

Therefore, one of the principal objects of my invention is to provide an irrigating implement equipped with means for preventing the fluid discharged therefrom from flowing to the surface of the ground about the implement.

Another object of my invention is to provide an implement of the above described character equipped with means for directing the flow of liquid discharged from the implement away from the same in a manner to effectively pervade the soil and feed adjacent plants.

A further object of my invention is to provide an implement of the above described type characterized by the simplicity of construction and effectiveness in accomplishing the desired result.

Other objects and advantages will be apparent from the following description, appended claims and annexed drawing.

Referring to the drawing wherein like reference characters designate like parts throughout the several views:

Fig. 1 is a view and side elevation of my invention illustrating the same as being inserted in the ground.

Fig. 2 is a sectional view on a line 2—2 thereof.

In practicing my invention, I employ a cylindrical casing 5 fashioned at the upper end thereof with a looped section 6 terminating in a threaded end to which is connected a water supply pipe, of typical construction, by means of a cutoff valve.

The lower end of the casing is formed with a reduced section 8 comprising a barrel, the upper end of which is secured within the casing in spaced relation therefrom by means of a suitable sleeve 9. The lower section or barrel is formed with a closed soil penetrating end 10 of substantial inverted conic configuration and is provided above said end with a plurality of discharge passages 11.

In the jointure of the barrel 8 with the casing 5, there is provided a concave face 12 surrounding said barrel. Adjacent the loop section 6, the casing is provided with a circumferentially extending member or flange 13 of concavo-convex formation, the concave face being positioned towards the lower section of the casing.

When the implement is inserted in the ground, as illustrated in the figures in the drawing, the concave face 12, formed on the casing at the jointure with the barrel, will force soil thereunder downwardly and pack the same about the barrel. Likewise, the concave face of the member 13 will pack soil about the casing during the inserting operation. Therefore, when water or other fluid is discharged through the passages 11 from the fluid supply, the flow of the same without the barrel will be prevented from flowing up and about the casing due to the hard packing of the soil by the aforesaid mentioned means. The packing of the soil as heretofore described serves to direct the flow of liquid from the implement in a manner to pervade the soil and feed the roots of adjacent plants.

Obviously, the flow of liquid from the liquid supply within the implement may be controlled or cut off by means of the valve 7 in a manner to effectively penetrate the soil away from the implement. It is to be understood that the flow of water or liquid to the casing is of a sufficient pressure to effectively penetrate the soil.

The implement may be readily inserted and extracted from the soil manually by means of the loop section 6. The concave face 12 and the outer wall of the casing form a cutting edge which lends to an easy insertion of the implement in the soil and resultant packing of the soil about the barrel.

While I have shown and described my invention as adaptable for irrigating purposes, it is to be distinctly understood that the same may be utilized in connection with operations of a like character and that various changes and modifications in the structure may be resorted to without departing from the spirit of the invention or scope of the appended claims. Furthermore, the terminology used in describing my invention is to be construed as merely descriptive and not by way of limitation.

Having described my invention, what I claim is:

1. In a device of the character described, comprising, a casing adapted for insertion in soil and fashioned with upper and lower sections, said upper section adapted to be connected to a source of liquid supply and said lower section formed with discharge openings for discharging the liquid into adjacent soil, said upper section of a larger diameter than said lower section and extending over a portion of said lower section to form an abutment therebetween, said abutment having a concave under face and provided with a marginal circumferentially extending cutting edge whereby to cut and pack soil about said lower section subjacent said upper section upon insertion of said casing within the soil, said upper section fashioned with a flange adjacent the top thereof and said flange having a lower concave face for packing soil about said upper section subjacent said flange to cooperate with the soil packed about said lower section by said abutment whereby to direct liquid discharged through said openings away from said casing for pervading the soil adjacent said casing.

2. In an irrigating implement adapted for insertion in soil, a casing having upper and lower sections, said lower section formed with discharge apertures, said upper section of a larger diameter than said lower section, said upper section extending over a portion of said lower section and forming a shoulder, said shoulder fashioned with a concave under face and provided with a marginal circumferentially extending cutting edge whereby to cut and pack soil about said lower section subjacent said upper section, said upper section fashioned with a looped upper end constituting a handle for inserting and withdrawing said casing into and out of the soil.

JOHN W. ADAMS.